Jan. 1, 1935. T. G. HOWDEN 1,986,576
APPARATUS FOR USE IN TEACHING PHYSICAL GEOGRAPHY AND THE LIKE
Filed Jan. 5, 1934
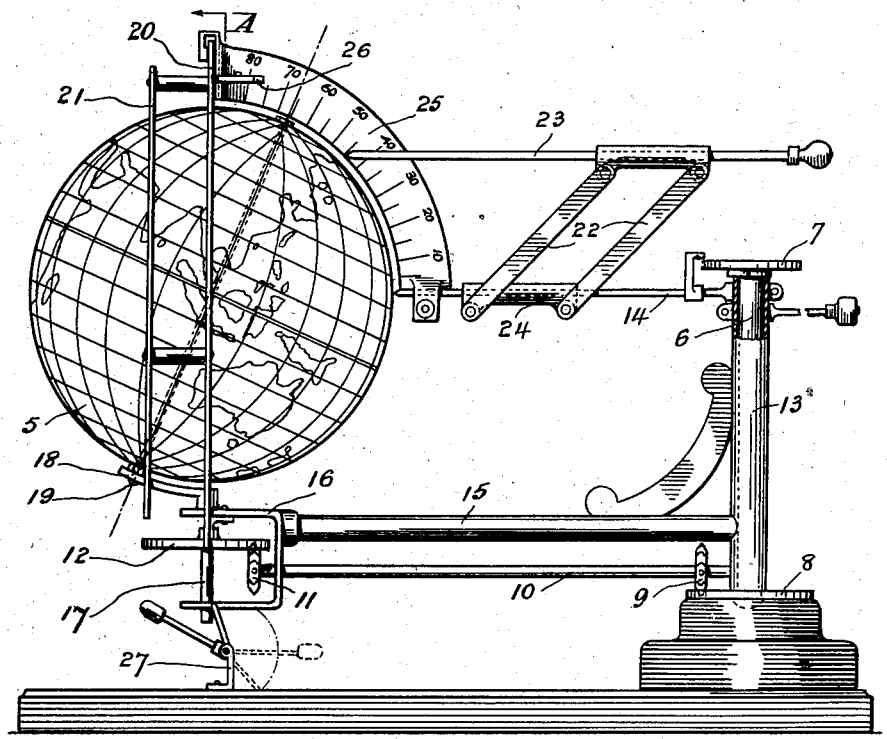
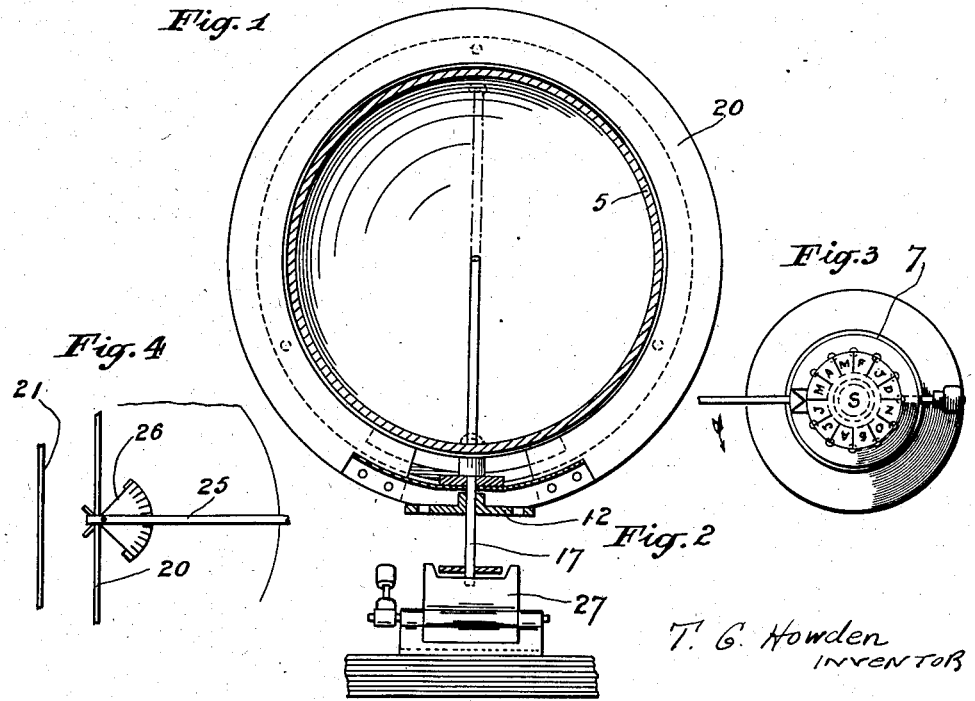
T. G. Howden
INVENTOR Patented Jan. 1, 1935

1,986,576

UNITED STATES PATENT OFFICE 1,986,576

APPARATUS FOR USE IN TEACHING PHYSICAL GEOGRAPHY AND THE LIKE

Thomas Gidley Howden, Hampton, Victoria, Australia

Application January 5, 1934, Serial No. 705,447
In Australia March 24, 1933

6 Claims. (Cl. 35—3)

This invention relates to the teaching of geography and allied subjects such as physical geography in which apparatus is used for demonstration purposes. The invention has for its object to provide a globe of the world so mounted and supplied with fittings that demonstrations can readily be made of physical phenomena in the teaching of the sciences.

But in order to fully understand the invention reference is made to the accompanying drawing, in which Fig. 1 shows a globe mounted in the machine in side elevation, with twilight and sun screens and protractor in position.

Fig. 2 is a sectional elevation of the globe on the line A of Fig. 1.

Fig. 3 is a plan view of the "sun disc" and,

Fig. 4 is a plan view of the quarter-circle plate on protractor.

The mundane globe 5 is mounted in suitable supports to permit of same revolving upon its axis as it moves around a fixed point to denote the sun. Upon a convenient base a vertical pillar 6 is fixed and carrying at its upper end the sun disc 7 upon which the months of the year are marked in progression anti-clockwise. The weeks may be also recorded upon the disc or an extension from same. The lower end of the pillar 6 is fixed in a plate 8 apertured to receive the teeth of a wheel 9 on a spindle 10 on the end of which is a similar wheel 11 in mesh with disc 12. The pillar 6 is enclosed within a sleeve 13 that carries the spindle 10, an arm 15 at right angles and extending far enough to support the globe 5 and what is described herein as the overhead pointer 14. One complete revolution of the arm 15 and globe about the pillar 6 is equivalent to a complete world year in which the earth has proceeded in its orbit around the sun while the direction of the axis remains permanent.

On the outer end of the arm 15 I mount a U shaped bracket 16 on its side and through which passes a vertical spindle 17 to which the disc 12 is secured. The bracket also supports the outer end of spindle 10 and toothed wheel 11 that meshes with disc 12. On the upper end of spindle 17 is a finger 18 curved to conform to the radius of the globe and on which is riveted the rod 19 that passes diametrically through the globe to provide the earth's axis. By means of the parts described, as the arm 15 moves around the pillar 6, the globe 5 will proceed in its orbit around the sun-point plate 7 and the position of the poles will vary as the lever 18 revolves with the spindle 17 through the disc 12 that is revolved through the spindle 10 and the toothed wheels 11 and 9 from the fixed disc 8 below the fixed pillar 6. The overhead pointer is also fixed on the sleeve 13 and revolves therewith and the globe: it extends close to the globe and at each equinox its point will be over the equator.

Also mounted on the bracket 16 is a fixed screen 20, called herein the daylight screen, and some sixteen or eighteen degrees behind said daylight screen and attached thereto is another screen 21 surrounding the globe and called the twilight screen, that is to say, the space between the two screens upon the earth's surface is that upon which twilight falls as the earth moves in its orbit while the surface before the daylight screen is in sunlight and the surface behind the twilight screen is in darkness. This can be demonstrated with this machine to vary with the position of the earth in its orbit around the sun. The plane of the daylight screen is vertical and bisects the globe through the poles at the equinoxes.

On the overhead pointer 14 is a sleeve supporting parallel levers 22 that are connected at their upper ends through a second sleeve on a rod or pointer 23. The lower sleeve 24 can turn on the member 14 while the parallel pointer 23 can be moved in a horizontal plane through the upper sleeve to bring its end close to the earth's surface at any desired point and at any particular time. Attached to the forward end of the overhead pointer 14 is a protractor 25 so disposed between member 14 and a pole as to lie with its edge parallel to the earth's surface. The protractor is calibrated from zero to ninety degrees and can be turned about its support, that is, the member 14. At the upper end the protractor is provided with a horizontal slit inwards in which a quadrant plate 26 is mounted hingeably on the end of same. By means of said plate which is calibrated, the position of sunrise or sunset north or south of east or west can be ascertained for any place on the earth's surface. At an equinox, if the protractor coincides with a meridian and the tip of the protractor touches the pole, then zero on the protractor corresponds to zero at the equator and ninety degrees on protractor corresponds to ninety degrees at the pole and the parallels of latitude, in turn, coincide with the like on the protractor and can be readily read by pushing the rod 23 close up to the earth's surface while in brushing contact with the protractor. At other times of year, the zenith distance of the sun will be seen, when the protractor lies along a meridian, to vary from the latitude by amounts up to twenty three and one half degrees. The reading of the mid-day sun to give the correct latitude can then be obtained with the aid of the Nautical Almanac.

The quadrant 26 at the end of the protractor can be used to indicate how many degrees north or south of east the sun rises. If one side of the said quadrant be placed along a meridian towards the pole when in daylight and away from the pole when it is in night, the other side will point to the east and the mark or calibration on the quadrant in the plane of the protractor will give the number of degrees that the sun rises or sets at that place on the earth north or south of east or west as the case may be.

Perhaps the most important as well as the most obvious lesson taught by the machine, will be the shining of the sun over the arctic regions throughout an entire day in the month of June and the areas of twilight and of darkness behind the daylight screen 20. As the shape of the earth is nearly a true sphere the sun can only shine vertically or from the zenith upon a small part thereof and the angle of incidence of the sun's rays will vary gradually from this small part over the rest of the globe to the daylight screen and where the parallel pointer touches the globe tangentially that point indicates the sun as on the horizon.

The position of the globe in relation to the sun in Fig. 1 is about June in the northern hemisphere from which it can be demonstrated that nearly the whole of the arctic regions are in perpetual sunlight during the entire day of twenty four hours and that Scotland experiences a continuous interval of twilight between sunset and sunrise.

The globe and its connections can be supported when the arm 15 is at rest upon a bracket 27 and there may, if desired, be several of such brackets placed at suitable points upon the base plate to stabilize the globe while demonstrating with it in selected positions. The protractor 25 may also extend further around the globe than is shown in Fig. 1 so as to be approximately one hundred and eighty degrees in length. The sun plate 7 can be marked with the words Aphhelion and Perihelion, same being in an ellipse upon the plate, the former denoted by "Aph" being at the end of the major axis of the ellipse near the month July and the latter denoted by "Per" at the opposite end near the month January. For the sake of clearness these marks have not been shown in Fig. 3 of the accompanying drawing. It may further, be explained that the globe is revolved upon its axis manually, that being found the mode most convenient to set same in any desired position for demonstration purposes. The gearing described essentially effects and accurately accounts for the positions of the earth during its orbital movement while the direction of the axis remains permanent.

The protractor 25 can be made from two parallel plates with the inner faces of same serrated: if the hinge pin of the quadrant 26 be fitted with splines it may be moved along between the plates of the protractor and held with the quadrant at predetermined points between the serrated faces instead of remaining fixed at the upper end and used in the machines made in the larger sizes to measure the angle between north and the sun.

Thus, by means of this apparatus the teaching of physical geography is assisted by readily demonstrating with the machine the physical phenomena well known and understood by the master.

Having now described my invention what I claim as new and desire to secure by Letters Patent is:—

1. In a machine of the kind described, a fixed pillar and a sleeve adapted to turn thereon, an arm on the sleeve, a rotatable globe on the arm, a daylight screen about the globe, overhead and parallel pointers on said sleeve adapted to turn therewith and a protractor attached to the forward end of the overhead pointer and to the daylight screen that extends over a part of the globe.

2. In a machine of the kind described, a fixed pillar and a sleeve adapted to turn thereon, an arm on the sleeve, a rotatable globe on the arm, a daylight screen about the globe, overhead and parallel pointers on said sleeve adapted to turn therewith, a protractor attached to the forward end of the overhead pointer and to the daylight screen that extends over a part of the globe and a sunplate on the fixed pillar.

3. In a machine of the kind described, a fixed pillar and a sleeve adapted to turn thereon, an arm on the sleeve and a rotatable globe on the arm, a daylight screen about the globe and an overhead pointer on and turning with the sleeve, parallel bars on the overhead pointer and a parallel pointer rotatably and slidably mounted in said bars that maintain said pointers always horizontal and parallel.

4. In a machine of the kind described, a fixed pillar and a sleeve adapted to turn thereon, an arm on the sleeve and a rotatable globe on the arm, a daylight screen about the globe and an overhead pointer on and turning with the sleeve, parallel bars on the overhead pointer, a parallel pointer rotatably and slidably mounted in said bars that maintain said pointers always horizontal and parallel and a protractor attached to the forward end of the overhead pointer and to the daylight screen extending over part of the globe adapted to turn on the pointer and to lie against the parallel pointer.

5. In a machine, of the kind described, a fixed pillar and a sleeve adapted to turn thereon, an arm on the sleeve and a rotatable globe on the arm, a daylight screen about the globe and an overhead pointer to turn with the sleeve, parallel bars on the overhead pointer and a parallel pointer rotatably and slidably mounted in said bars to maintain said pointers always horizontal and parallel, a protractor attached to the forward end of the overhead pointer and to the daylight screen extending over part of the globe and adapted to turn on the pointer and to lie against the parallel pointer and a quadrant plate on the upper end of the protractor adapted to turn in a plane at right angles to the plane of the protractor plate.

6. In a machine of the kind indicated, a fixed pillar and a sleeve adapted to turn thereon, a sun plate on the pillar, an arm on the sleeve and a bracket on the arm, a spindle in the bracket, means for rotating the spindle and a finger approximately at right angles to the same, a globe supported on said finger adapted to be revolved with the finger while rotating with the arm on said sleeve, a daylight screen about the globe, parallel pointers from the sleeve on the fixed pillar to the globe and a protractor attached to the end of the lower or overhead pointer and to the daylight screen extending over part of the globe, adapted to turn on the pointer and to lie against the parallel pointer.

THOMAS GIDLEY HOWDEN.